April 26, 1960          A. E. BLAKE          2,934,647
OPTICAL ANALYZER
Filed Oct. 22, 1956          2 Sheets-Sheet 1
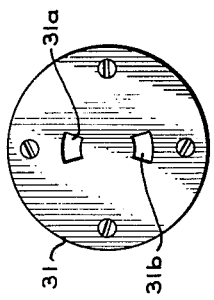
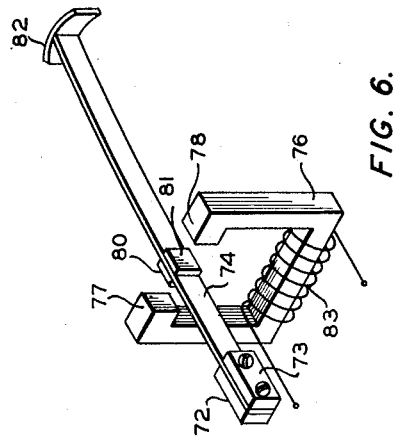
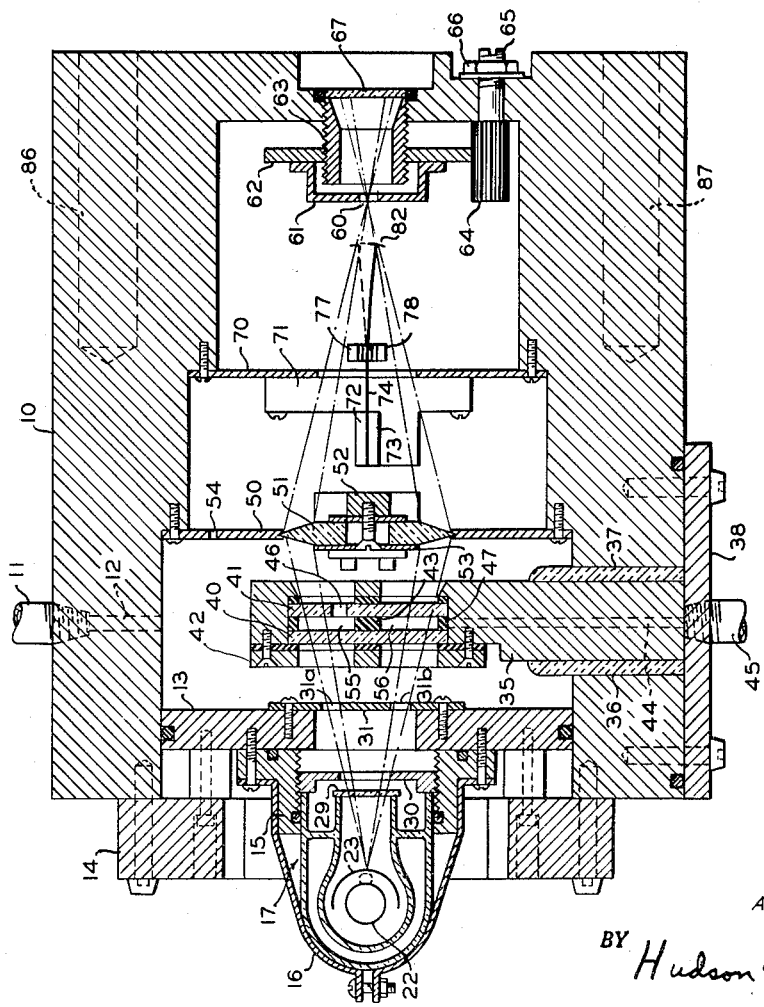
INVENTOR.
A. E. BLAKE
BY *Hudson & Young*
ATTORNEYS April 26, 1960     A. E. BLAKE     2,934,647
OPTICAL ANALYZER
Filed Oct. 22, 1956     2 Sheets-Sheet 2
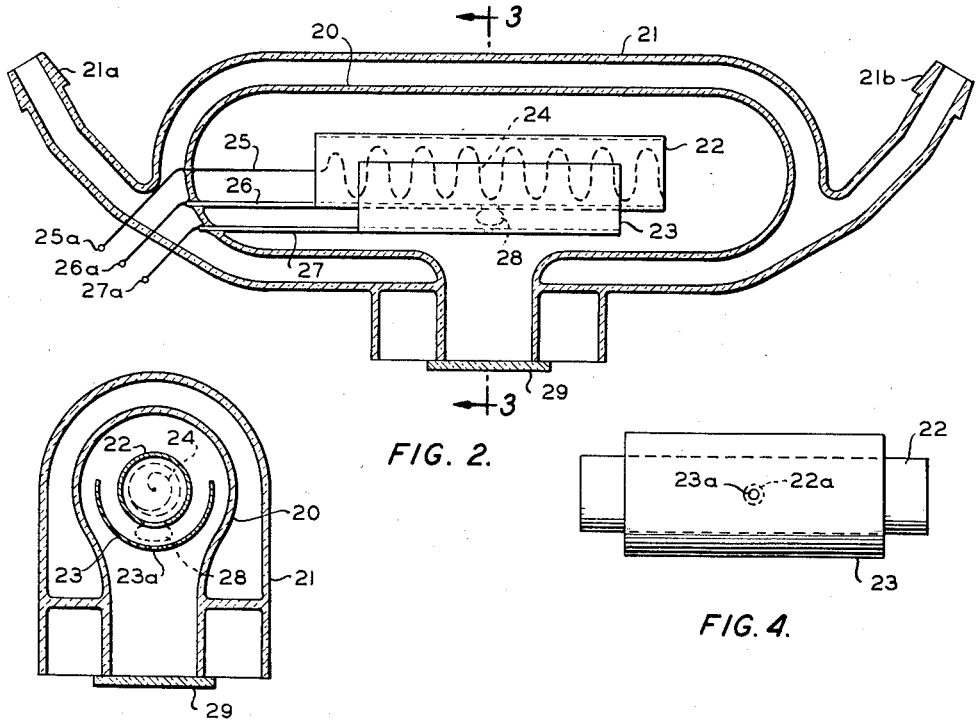
FIG. 2.
FIG. 3.
FIG. 4.
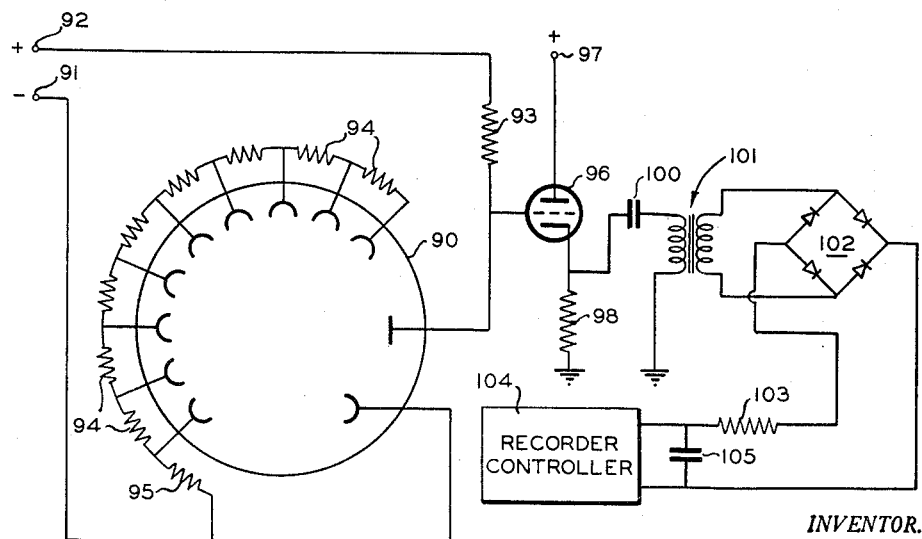
FIG. 7.
INVENTOR.
A. E. BLAKE
BY *Hudson & Young*
ATTORNEYS

United States Patent Office 2,934,647
Patented Apr. 26, 1960

2,934,647
OPTICAL ANALYZER

Arthur E. Blake, Bartlesville, Okla., assignor to Phillips Petroleum Company, a corporation of Delaware Application October 22, 1956, Serial No. 617,581

15 Claims. (Cl. 250—43.5)

This invention relates to a method of and apparatus for detecting the presence and concentration of materials which are capable of absorbing electromagnetic radiation. In another aspect, it relates to an improved radiation source.

It is known that various materials are capable of absorbing electromagnetic radiation of wave lengths which are characteristic of the particular material. A number of optical analyzers have been proposed which utilize this principle. Electromagnetic radiation is commonly classified in the following spectral regions in the order of increasing frequencies and decreasing wave lengths: audio, radio and radar frequencies, infrared, visible, ultraviolet, vacuum ultraviolet, X-ray, gamma rays and cosmic ray regions. Most presently known analyzers utilize radiation in the infrared, visible or ultraviolet regions.

The vacuum ultraviolet region is commonly defined as the region between about 10 and 1850 angstroms. This portion of the spectrum is referred to as the vacuum ultraviolet because the atmospheric gases, principally oxygen, strongly absorb radiation in this region. This requires that the optical paths utilized in measurements in this region be evacuated. In the vacuum ultraviolet absorption region, most light hydrocarbons are relatively opaque at wave lengths shorter than approximately 1400 angstroms. As the ultraviolet and vacuum ultraviolet regions are scanned in terms of increasing wave lengths, it is found that the several classes of hydrocarbons become transparent in the following order: paraffins, isoparaffins, monoolefins, diolefins and aromatics. In general, paraffins and cycloparaffins are transparent down to the vicinity of 1400 to 1800 angstroms, monoolefins to 1800 to 2000 angstroms, diolefins to about 2540 angstroms, and aromatics up to about 2700 angstroms. Because of these differences, it is possible to detect one type of hydrocarbon in the presence of another type.

In accordance with the present information, an analyzer is provided which is particularly useful in analyzing mixtures of hydrocarbons which absorb electromagnetic radiation in the ultraviolet and vacuum ultraviolet regions. Radiation from a suitable source is restricted to a relatively narrow band of wave lengths by means of a focal isolation monochromator. This radiation is divided into two beams. One beam is directed through a sample of the material to be analyzed, and the second beam is directed through a reference sample or through a dummy cell. The two transmitted beams are then directed toward a suitable radiation detector. An opaque member is alternatively positioned in the two beams so that the detector receives the beams alternatively. The difference in radiation received by the detector during the two half cycles is measured to provide an indication of the composition of the material through which the first radiation beam is directed.

A novel source of ultraviolet radiation is also provided in accordance with this invention. This source comprises a heated cathode which is surrounded by an anode having a small opening therein. The region between the cathode and anode is filled with a gas, such as hydrogen, argon, or xenon. The cathode is provided with an opening adjacent the opening in the anode and of larger diameter. This results in a small area source of radiation.

Accordingly, it is an object of this invention to provide a method of and apparatus for analyzing fluid mixtures in terms of the electromagnetic radiation absorption properties of the constituents of the mixture.

Another object is to provide an improved point source of electromagnetic radiation.

A further object is to provide an improved double beam optical analyzer.

Other objects, advantages and features of the invention should become apparent from the following detailed description which is taken in conjunction with the accompanying drawing in which:

Figure 1 is a sectional view of the optical system of the analyzer of this invention.

Figure 2 is a detailed view, shown partially in section, of the radiation source of this invention.

Figure 3 is a sectional view taken along line 3—3 in Figure 2.

Figure 4 is a detailed view of the anode and cathode of the light source of Figure 3.

Figure 5 is a front view of an apertured plate employed in the analyzer of Figure 1.

Figure 6 is a perspective view of the light interrupter employed in the analyzer of Figure 1.

Figure 7 is a schematic circuit drawing of the radiation measuring apparatus.

Referring now to the drawing in detail and to Figure 1 in particular, there is shown an optical analyzer which comprises a housing 10. A passage 12 in housing 10 communicates with a conduit 11 which in turn is connected to a vacuum pump, not shown. This permits the interior of housing 10 to be evacuated. An apertured plug 13 is fitted into one end of housing 10. This plug is attached to an end plate 14 which in turn is attached to housing 10. An annular radiation source support 15 is attached to plug 13. A radiation source 17 is inserted in support 15 and retained in position by means of a bracket 16.

Radiation source 17 is shown in detail in Figures 2, 3, and 4. A cylindrical cathode 22 which is mounted inside a glass envelope 20 by means of a support pin 26. Cathode 22 is partially surrounded by an anode 23 which is also mounted within envelope 20 by means of a support pin 27. Envelope 20 is filled with a gas, such as hydrogen, argon, or xenon, which emits radiation in the ultraviolet and vacuum ultraviolet regions when excited. Envelope 20 is in turn enclosed within a housing 21 through which a coolant can be circulated from an inlet opening 21a to an outlet opening 21b. An electrical heating element 24 is mounted within cathode 22. One terminal of heating element 24 is connected to cathode 22 and the second terminal is connected by means of a conductor 25 to a terminal 25a. Pins 26 and 27 are connected to respective terminals 26a and 27a. A source of current is connected between terminals 25a and 26a to heat cathode 22. A source of direct voltage is applied between terminals 26a and 27a so that anode 23 is maintained at a potential which is positive with respect to the potentials on cathode 22.

Circular openings 22a and 23a are formed in cathode 22 and anode 23, respectively, adjacent one another. Opening 23a is substantially smaller than opening 22a. In the operation of this radiation source, an arc appears between the anode and cathode, as indicated by reference numeral 28. Opening 23a thus serves as a point source of radiation. This eliminates the need for additional apertures or focusing lenses. A plate 29 of material which is transparent to radiation in the ultraviolet and vacuum ultraviolet regions of interest is mounted across the opening of envelope 20. Plate 29 can be formed of materials such as quartz, calcium fluoride, or lithium fluoride, for example. In one specific embodiment of the radiation source of this invention, opening 23a was 0.020 inch in diameter and opening 22a was 0.090 inch in diameter. Cathode 22 was spaced approximately 1/8 inch from anode 23 near openings 22a and 23a and approximately 3/16 inch adjacent the outer edges of anode 23. Tube 20 was filled with hydrogen at a pressure in the range of 0.1 to 20 mm. mercury. The starting voltage between cathode 22 and anode 23 was of the order of 300 volts and the operating voltage was of the order of 60 volts.

The radiation emitted from source 17 passes through an apertured plate 30 which is attached to support 15 of Figure 1. The resulting conical beam of radiation strikes a plate 31 which has a pair of openings 31a and 31b therein, as shown in Figure 5. This results in two diverging beams of radiation. A sample cell assembly is disposed within these radiation beams. This assembly comprises first and second circular plates 40 and 41 of radiation transparent material which are spaced from one another by sealing members 43 and 47. Plates 40 and 41 are mounted in an annular opening in a base 35 which is fitted into an opening in housing 10. Heat insulating spacers 36 and 37 are disposed between base 35 and housing 10. A plate 38 retains the cell assembly in position within housing 10. An annular cover plate 42 retains plates 40 and 41 within the opening in base 35. Spacer 43 divides the region between plates 40 and 41 into two chambers 55 and 56. A passage 44 in base 35 extends from chamber 56 to an inlet conduit 45. A fluid sample to be analyzed is introduced into chamber 56 through passage 44 and is removed through a corresponding passage, not shown. An opening 46 is formed in plate 41 so that chamber 55 communicates with the interior of housing 10. However, in some applications of the analyzer of this invention, this opening can be closed and chamber 55 can be provided with inlet and outlet passages so that a reference fluid can be circulated through chamber 55.

An annular lens 51 is mounted within housing 10 by means of a support 52 so that the two radiation beams transmitted through chambers 55 and 56, respectively, pass through the outer portion of the lens. An apertured plate 50 is mounted within housing 10 adjacent the periphery of lens 51, and a circular opaque plate 53 is mounted across the center of lens 51.

The two beams of radiation are converged by lens 51 toward an aperture 60 in a plate 61. Plate 61 is attached to an annular gear 62 which is threaded to a sleeve member 63, the latter being threaded into housing 10 and retained rigidly in place. Gear 62 can thus be rotated so that plate 61 moves inwardly or outwardly. This rotation is accomplished by means of a gear 64 which has a slotted outer end 65 that is engaged by a lock nut 66. Rotation of gear 64 thus causes gear 62 to rotate on sleeve 63 to move opening 60 inwardly or outwardly. The radiation transmitted through opening 66 strikes a phosphor plate 67.

A radiation beam interrupter assembly is mounted within housing 10 between lens 51 and exit aperture 60. This assembly comprises an apertured plate 70 which supports a vibrator assembly 71. The vibrator comprises a U-shaped magnet 76 having facing pole pieces 77 and 78. A coil 83 is mounted on magnet 76. This coil is connected to a source of alternating current. A flexible plate 74 is secured at one end between a pair of support plates 72 and 73. Plate 74 extends between the pole pieces of magnet 76 and is provided with blocks 80 and 81 of magnetic material. An opaque plate 82 is attached to the outer end of flexible plate 74. When coil 83 is energized by a source of alternating current, plate 74 moves back and forth between the pole pieces of the magnet so that plate 82 alternately blocks the two radiation beams.

Housing 10 is provided with openings 86 and 87 into which can be inserted thermostats and heating elements if it is desired to maintain the assembly at a constant temperature. The cell assembly is surrounded by spacers 36 and 37 of insulating material so that the cell assembly can be maintained at a different temperature, if desired.

Lens 51 is mounted with respect to light source 17 so that radiation emitted therefrom is focused in the general region of aperture 60. Lens 51 can advantageously be constructed of quartz which is transparent in the ultraviolet region and which exhibits a rather rapid change in refractive index with respect to a change in wave length in this region. Such a change in refractive index with changing wave length results in chromatic aberration of the lens so that radiation emitted from source 17 is not focused at an exact point on the optical axis of lens 51. Instead, the different wave lengths emitted from source 17 are focused at different points along the optical axis. The longer wave lengths are focused at a point farther from lens 51 than are the shorter wave lengths. Thus, by positioning aperture 60 at a selected point only wave lengths of a given range of values are transmitted through this aperture to strike plate 67. The shorter wave lengths are focused at a point in front of aperture 60 so that only a small portion of the radiation of these wave lengths passes through aperture 60. Opaque disk 53 blocks rays other than those which are dispersed a predetermined amount by lens 51. This focal isolation monochromator assembly thus permits only a selected band of wave lengths transmitted through chambers 55 and 56 to impinge upon plate 67. The band can be adjusted by rotating gear 64.

If chambers 55 and 56 are both empty, equal amounts of radiation are transmitted through the chambers so that the two radiation beams which alternately impinge upon plate 67 are of equal magnitude. However, if a fluid is circulated through chamber 56 which contains a constituent that absorbs radiation in the transmitted wave lengths, less radiation is transmitted by the beam passing through this chamber 56. This results in unequal amounts of radiation impinging upon plate 67 from the two beams. The magnitude of this difference thus provides an indication of the amount of absorbing constituents present in chamber 56. This difference can be measured by means of the apparatus illustrated in Figure 7.

A photomultiplier tube 90 is disposed so that the radiation from phosphor plate 67, which can be sodium salicylate, for example, impinges upon the cathode thereof. The cathode of tube 90 is connected to a terminal 91 which is negative with respect to a second terminal 92. The anode of tube 90 is connected to terminal 92 through a resistor 93. The adjacent dynodes of tube 90 are connected to one another through respective resistors 94. The dynodes of tube 90 adjacent the cathode is connected to terminal 91 through a resistor 95. The anode of tube 90 is also connected to the control grid of a triode 96 which is connected as a cathode follower. The anode of triode 96 is connected to a positive potential terminal 97. The cathode of triode 96 is connected to ground through a resistor 98. The cathode of triode 96 is also connected through a capacitor 100 to the first end terminal of the primary winding of a transformer 101. A second terminal of the primary winding of the transformer 101 is connected to ground. The secondary winding of transformer 101 is connected across first opposite terminals of a rectifier bridge network 102. A third terminal of bridge network 102 is connected through a resistor 103 to the first input terminals of a recorder-controller 104. The fourth terminal of bridge network 102 is connected to the second input terminal of recorder-controller 104. A filter capacitor 105 is connected across the input terminals of recorder-controller 104.

The output signal of photomultiplier tube 90, which is representative of the radiation impinging upon plate 67, is thus rectified and measured. The magnitude of this measured signal is representative of the difference between the amounts of radiation in the two beams which impinge upon plate 67. This signal can be measured, or it can be employed for control purposes when the analyzer is employed as part of a chemical process control system.

From the foregoing description, it should be evident that there is provided a compact analyzer assembly which can be employed to advantage to measure the concentration of materials which absorb radiation in the ultraviolet spectrum. One particular application of this analyzer is in measuring the ethylene concentration in the effluent recycle stream from an alkylation reactor. For example, such a stream can contain from 0.5 to 1.5% ethylene, the remainder being paraffins, including substantial amount of isobutane. A typical analysis of such a stream is as follows:

| Component: | Mol. percent |
| --- | --- |
| Methane | 1.66 |
| Ethylene | 0.94 |
| Ethane | 5.18 |
| Propane | 2.69 |
| Isobutane | 62.30 |
| Normal butane | 4.15 |
| Pentane and heavier | 23.08 |

Radiation in the region of 1680 to 1750 angstroms is employed. A sample cell 2 mm. thick at a pressure of one atmosphere gives sufficient sensitivity to make such an analysis. The effect of scattered radiation of wave lengths longer than 2100 angstroms can advantageously be avoided if the tube 90 is sealed directly to the vacuum system in place of the phosphor coated window 67 and tube 90 has both a platinum cathode and a high purity quartz envelope.

While the invention has been described in conjunction with a present preferred embodiment, it should be evident that it is not limited thereto.

What is claimed is:

1. An analyzer comprising a source of electromagnetic radiation, a radiation detector, means to direct two beams of radiation from said source toward said detector, means to position a sample of material to be analyzed in one of said beams, filter means in said two beams to block wave lengths longer and shorter than a preedtermined band, means to block said two beams alternately at a predetermined frequency, and means to measure the difference in radiation impinging upon said detector from said two beams.

2. The analyzer of claim 1 wherein said means to block comprises an opaque member, a support attached to said opaque member, said support being formed at least in part of magnetic material, and means to establish a fluctuating magnetic field adjacent the magnetic material of said support for inducing movement of said support in response to such field through a path to move said opaque member alternately into said two beams.

3. An analyzer comprising a source of electromagnetic radiation, a radiation detector, means to direct two beams of radiation from said source toward said detector, means to position a sample of material to be analyzed in one of said beams, a focal isolation monochromator disposed in said two beams to block wave lengths longer and shorter than a predetermined band, means to block said two beams alternately at a predetermined frequency, and means to measure the difference in radiation impinging upon said detector from said two beams.

4. An analyzer comprising a source of electromagnetic radiation, a radiation detector, means to direct two beams of radiation from said source toward said detector, means to position a sample of material to be analyzed in one of said beams, a lens positioned in the paths of said beams so that said beams are focused at approximately the same point on the optical axis of said lens, an aperture positioned on said optical axis adjacent the common focal point and between said lens and said detector so as to block wave lengths longer and shorter than a predetermined band, means to block said two beams alternately at a predetermined frequency, and means to measure the difference in radiation impinging upon said detector from said two beams.

5. The analyzer of claim 4 further comprising means to move said aperture on the optical axis of said lens toward and away from said lens to adjust the band of wave lengths passed therethrough.

6. The analyzer of claim 4 wherein said source provides radiation in the ultraviolet and vacuum ultraviolet regions, said aperture is positioned with respect to said lens so as to pass some radiation of wave lengths shorter than 2100 angstroms, and said detector comprises a photomultiplier tube having both a platinum cathode and a high purity quartz envelope.

7. An analyzer comprising a housing, a source of electromagnetic radiation in the vacuum ultraviolet region positioned in said housing, a radiation detector positioned in said housing in spaced relationship with said source, means to direct two beams of radiation from said source toward said detector, means to position a sample of material to be analyzed in one of said beams, filter means in said two beams to block wave lengths longer and shorter than a predetermined band, means to block said two beams alternately at a predetermined frequency, means to evacuate said housing, and means to measure the difference in radiation impinging upon said detector from said two beams.

8. An analyzer comprising a source of electromagnetic radiation including a first electrode, a second electrode spaced from said first electrode, said first electrode having a first opening therein, said second electrode having a second opening therein adjacent said first opening, the area of said second opening being less than the area of said first opening, a fluid tight envelope enclosing said first and second electrodes, means for applying a potential between said first and second electrodes so that said second electrode is positive with respect to said first electrode, and a radiation emitting gas in said envelope; a radiation detector; means to direct two beams of radiation from said source toward said detector; means to position a sample of material to be analyzed in one of said beams; filter means in said two beams to block wave lengths longer and shorter than a predetermined band; means to block said two beams alternately at a predetermined frequency; and means to measure the difference in radiation impinging upon said detector from said two beams.

9. A source of electromagnetic radiation comprising a first electrode, a second electrode spaced from said first electrode, said first electrode having a first opening therein, said second electrode having a second opening therein adjacent said first opening, the area of said second opening being less than the area of said first opening, a fluid tight envelope enclosing said first and second electrodes, means for applying a potential between said first and second electrodes so that said second electrode is positive with respect to said first electrode, and a radiation emitting gas in said envelope.

10. The radiation source of claim 9 wherein said first electrode is substantially cylindrical in shape, said second electrode at least partially encloses said first electrode, and said openings are generaly circular in shape.

11. A source of electromagnetic radiation comprising a first electrode, a second electrode spaced from said first electrode, said first electrode having a first opening therein, said second electrode having a second opening therein adjacent said first opening, the area of said second opening being less than the area of said first opening, a fluid tight envelope enclosing said first and second electrodes, means for applying a potential between said first and second electrodes so that said second electrode is positive with respect to said first electrode, means to heat said first electrode, and a radiation emitting gas in said envelope.

12. The radiation source of claim 11 further comprising a second envelope enclosing said first-mentioned envelope, and means to circulate a coolant through said second envelope.

13. An analyzer comprising a housing; a source of electromagnetic radiation in the vacuum ultraviolet region positioned in said housing, said source including a first electrode, a second electrode spaced from said first electrode, said first electrode having a first opening therein, said second electrode having a second opening therein adjacent said first opening, the area of said second opening being less than the area of said first opening, a fluid tight envelope enclosing said first and second electrodes, means for applying a potential between said first and second electrodes so that said second electrode is positive with respect to said first electrode, and a gas disposed in said envelope which emits radiation in the vacuum ultraviolet region when subjected to an electrical discharge; a radiation detector positioned in said housing in spaced relationship with said source; means to evacuate said housing; means to direct two beams of radiation from said source through said housing toward said detector; means to position a sample of material to be analyzed in one of said beams; filter means in said two beams to block wave lengths longer and shorter than a predetermined band; means to block said two beams alternately at a predetermined frequency; and means to measure the difference in radiation impinging upon said detector from said two beams.

14. The analyzer of claim 13 wherein said envelope is filled with a gas selected from the group consisting of hydrogen, argon and xenon.

15. The radiation source of claim 9 wherein said envelope is filled with a gas selected from the group consisting of hydrogen, argon and xenon.

References Cited in the file of this patent

UNITED STATES PATENTS

| | | |
|---|---|---|
| 2,246,884 | Johnson | July 24, 1941 |
| 2,559,688 | Touvet | July 10, 1951 |
| 2,758,216 | Luft | Aug. 7, 1956 |
| 2,764,692 | Miller | Sept. 25, 1956 |